Patented May 31, 1932

1,860,687

UNITED STATES PATENT OFFICE

WILLIAM HENRY MOSS, OF CUMBERLAND, MARYLAND, ASSIGNOR TO CELANESE CORPORATION OF AMERICA, OF NEW YORK, N. Y., A CORPORATION OF DELAWARE

COATED ARTICLE AND METHOD OF PREPARING THE SAME

No Drawing. Application filed March 8, 1928. Serial No. 260,255.

This invention relates to the coating of foraminous material with a transparent film having a preponderance of cellulose acetate or organic derivatives of cellulose to produce transparent or translucent material that may be used as a glass substitute.

An object of my invention is to produce flexible glass substitute that is strong and resistant to weathering.

A further object of my invention is to produce a glass substitute by coating a wire screen with a coating composition containing synthetic resins so as to afford greater protection to the metallic screen against oxidation or rusting. Other objects of my invention will appear from the following detailed description.

One of the forms of glass substitute as made at present consists of a wire netting coated with a cellulose acetate film. The small films filling the meshes of the netting form a large number of minute panes of "flexible glass" which allow a larger proportion of ultra-violet light to pass through than ordinary glass, and the whole forms a flexible and not easily broken substitute for glass. However, when this material is exposed to the effect of the weather, as in many of its applications, moisture penetrates through the film to the wire and this, in time, rusts and thereafter a rapid deterioration of the netting occurs.

I have found that protective films or coatings prepared from lacquers containing organic derivatives of cellulose such as cellulose acetate and various synthetic resins are more useful as protective coatings than lacquer made from cellulose acetate without the addition of the said resins.

I have also found that if the netting is given a protective coating of a film of the said resins, such coating being sufficient to cover the wire but not sufficient to fill the spaces between the wire, it may then be given a second coating of organic derivatives of cellulose, such as cellulose acetate and the spaces thereby filled in. The flexible glass produced in this way has also superior weather resistance, the protective action of the resins being in this way concentrated around the wire which it is desired to prevent from rusting.

In accordance with my invention I coat a foraminous material with a coating composition containing a synthetic resin. In one form of my invention the foraminous material is given merely a light coat of the coating composition that contains the synthetic resin so that the interstices or meshes are not completely closed, and then a further coat of coating composition which contains organic derivatives, with or without synthetic resins, is applied in sufficient quantity to close the meshes. In another form of my invention, sufficient coating composition containing both organic derivatives of cellulose and synthetic resin is applied in sufficient quantities to entirely close the meshes of the foraminous material.

The foraminous material treated in accordance with my invention may be of any suitable character such as screen, gauze, fabric or the like, and may be made of any suitable material such as metal or animal or vegetable fibres. While copper or galvanized iron or steel screen may be used, the greatest advantages are obtained by the use of iron or steel wire screen without any previous treatment, since this material is cheapest, and is protected against rusting by the coating composition containing the synthetic resin.

As stated before, the coating composition that comes in direct contact with the wire of the screen should contain a synthetic resin. The synthetic resin used may be of the phenol-aldehyde type and particularly of the type prepared in the presence of an acid catalyst as described in my copending application 217,536 filed Sept. 3, 1927. On the other hand, it may be a diphenylol propane aldehyde resin or a diphenylol propane ketone resin, as described in my copending application 230,186 filed Oct. 31, 1927; a diphenylol propane ketone aldehyde resin as described in my copending application 227,871 filed Oct. 21, 1927; a phenol furfural resin as described in the application filed by Moss and White Serial No. 258,998 filed March 3, 1928; an aniline furfural resin as described in the application filed by Moss and White Serial No. 258,999 filed March 3, 1928; or an acetone furfural resin as described in my copending application Serial No. 259,000 filed March 3, 1928. A mixture of two or more such synthetic resins may be used. I prefer to use a synthetic resin which is light-proof or which has been rendered light-proof.

The coating composition containing the synthetic resin, if it is applied only in sufficient quantities to coat the wire but in insufficient quantities to close the mesh of the foraminous material, may or may not contain organic derivatives of cellulose. If it is used to close the meshes of the screen, it should contain organic derivatives of cellulose. Examples of organic derivatives of cellulose are organic esters such as cellulose acetate, cellulose formate, cellulose propionate and cellulose butyrate; and cellulose ethers, such as ethyl cellulose, metyl cellulose and benzyl cellulose.

The coating composition may or may not contain suitable plastifiers or softeners such as diethyl phthalate, tricresyl phosphate, triphenyl phosphate, various amides, such as mono methyl toluene sulfonamid, triacetin, diphenylol propane, thiocarbanilid, etc. The coating composition also may or may not contain natural gums or resins or semisynthetic resins such as manila, accaroides, pontianak, kauri, dammar, rosin, shellac or ester gum (glycerol ester of rosin). The coating composition may contain medium and/or high boiling solvents such as ethyl acetate, ethyl lactate, tetrachlorethane, bengyl alcohol or diacetone alcohol. Of the volatile solvents that may be used in the coating composition the following may be mentioned: acetone, alcohol (ethyl or methyl) benzene or ethylene dichloride.

In case the coating composition containing the synthetic resin is applied in quantities that are not sufficient to close the meshes or interstices of the foraminous material, the coating composition that is applied to close the meshes will contain the organic derivatives of cellulose, but need not necessarily contain synthetic resins.

In order to further explain my invention but without limiting myself to the specific details thereof, the following examples are given.

*Example I*

The following examples are given for preparing the flexible glass substitute in accordance with the first form of my invention, i. e. the application of the coating composition in two steps, wherein the first coat contains the synthetic resin.

An iron or steel screen containing 14 meshes per inch is dipped in a solution containing a synthetic resin which may be of either of the following solutions.

|   | Parts |
|---|---|
| A—Diphenylol propane formaldehyde resin | 10 |
| Acetone | 100 |
| B—Phenol formaldehyde resin | 8 |
| Diethyl phthalate | 2 |
| Acetone | 100 |
| Ethyl lactate | 5 |

After dipping the solution is allowed to drain off the screen so that the meshes thereof are not filled in. The screen is then dipped in a second solution containing organic derivatives of cellulose of which the following are examples.

|   | Parts |
|---|---|
| A—Cellulose acetate | 10 |
| Acetone | 100 |
| B—Cellulose acetate | 5 |
| Acetone | 50 |
| Alcohol | 25 |
| Benzene | 25 |
| Ethyl lactate | 2 |
| C—Cellulose acetate | 15 |
| Diethyl phthalate | 1 |
| Tricresyl phosphate | 1 |
| Triphenyl phosphate | 1 |
| Triacetin | 1 |
| Acetone | 100 |

The meshes of the wire are closed by these solutions to form the finished flexible glass substitute after drying.

*Example II*

The following examples are given for preparing the flexible glass substitute in accordance with the second form of my invention, i. e., the application of the coating composition containing both the synthetic resin and the organic derivative of cellulose throughout the entire process.

The wire screen is dipped in either of the following solutions:

|   | Parts |
|---|---|
| A—Cellulose acetate | 10 |
| Synthetic resin | 2 |
| Acetone | 100 |
| B—Cellulose acetate | 10 |
| Synthetic resin | 5 |
| Diethyl phthalate | 3 |
| Acetone | 100 |
| Ethyl lactate | 2 |

The meshes of the screen are entirely closed by the film produced from either of the above coating compositions.

If desired any suitable pigments, dyes, powdered metal, etc., may be added either to produce artistic or colored effects or for the further protection of the wire, the said additions being made either in the first, second or both solutions when two dippings are given.

Obviously other methods of coating the screen may be used. Thus instead of dipping the screen in a coating bath by a batch process, the screen may have the solution applied thereto by spraying, brushing and dipping in a continuous manner, and then passed continuously over a heating table or through a drier or other suitable apparatus.

It is to be understood that the foregoing details are given merely by way of illustration and that many variations may be made therein without departing from the spirit of this invention.

Having described my invention, what I claim and desire to secure by Letters Patent is:

1. The method of coating a metallic screen comprising applying a coating composition containing a synthetic resin to the same in quantities insufficient to close the meshes thereof and then applying a coating composition containing an organic derivative of cellulose in quantities sufficient to close said meshes.

2. The method of coating a metallic screen comprising applying a coating composition containing a synthetic resin to the same in quantities insufficient to close the meshes thereof and then applying a coating composition containing cellulose acetate in quantities sufficient to close said meshes.

3. The method of coating a metallic screen comprising applying a coating composition containing a phenol aldehyde resin to the same in quantities insufficient to close the meshes thereof and then applying a coating composition containing organic derivatives of cellulose in quantities sufficient to close said meshes.

4. The method of coating a metallic screen comprising applying a coating composition containing a phenol aldehyde resin to the same in quantities insufficient to close the meshes thereof and then applying a coating composition containing cellulose acetate in quantities sufficient to close said meshes.

5. A flexible glass substitute comprising a metallic screen the meshes of which are coated with a synthetic resin and having a coating of a composition containing an organic derivative of cellulose sufficient to close the meshes.

6. A flexible glass substitute comprising a metallic screen the meshes of which are coated with a synthetic resin and having a coating of a composition containing cellulose acetate sufficient to close the meshes.

7. A flexible glass substitute comprising a metallic screen the meshes of which are coated with a phenol aldehyde resin and having a coating of a composition containing an organic derivative of cellulose sufficient to close the meshes.

8. A flexible glass substitute comprising a metallic screen the meshes of which are coated with a phenol aldehyde resin and having a coating of a composition containing cellulose acetate sufficient to close the meshes.

9. The method of coating a metallic screen comprising applying a coating composition containing an acetone furfural resin to the same in quantities insufficient to close the meshes thereof and then applying a coating composition containing organic derivatives of cellulose in quantities sufficient to close said meshes.

10. The method of coating metallic screen comprising applying a coating composition containing an acetone furfural resin to the same in quantities insufficient to close the meshes thereof and then applying a coating composition containing cellulose acetate in quantities sufficient to close said meshes.

11. The method of coating a metallic screen comprising applying a coating composition containing a diphenylol propane ketone resin to the same in quantities insufficient to close the meshes thereof and then applying a coating composition containing organic derivatives of cellulose in quantities sufficient to close said meshes.

12. The method of coating a metallic screen comprising applying a coating composition containing a diphenylol propane ketone resin to the same in quantities insufficient to close the meshes thereof and then applying a coating composition containing cellulose acetate in quantities sufficient to close said meshes.

13. A flexible glass substitute comprising a metallic screen the meshes of which are coated with an acetone furfural resin and having a coating of a composition containing an organic derivative of cellulose sufficient to close the meshes.

14. A flexible glass substitute comprising a metallic screen the meshes of which are coated with an acetone furfural resin and having a coating of a composition containing cellulose acetate sufficient to close the meshes.

15. A flexible glass substitute comprising a metallic screen the meshes of which are coated with a diphenylol propane ketone resin and having a coating of a composition containing an organic derivative of cellulose sufficient to close the meshes.

16. A flexible glass substitute comprising a metallic screen the meshes of which are coated with a diphenylol propane ketone resin and having a coating of a composition containing cellulose acetate sufficient to close the meshes.

In testimony whereof, I have hereunto subscribed my name.

WILLIAM H. MOSS.